Patented Dec. 1, 1931

1,834,814

UNITED STATES PATENT OFFICE

JOHN P. WETHERILL, 3D, OF KENSINGTON, MARYLAND

PROCESS FOR SEPARATING AMMONIA FROM GASES

No Drawing.  Application filed September 9, 1927. Serial No. 218,583.

This invention relates to the absorption of ammonia either in pure form or in mixtures and it more particularly relates to a solid absorbent.

Ammonia is frequently removed from gaseous mixtures in the catalytic nitrogen fixation process by absorption in water. However, inasmuch as water vapor thereby enters the catalyst chamber, there is, especially in the case of a sensitive catalyst, a reduction in its efficiency. It has also been the practice heretofore to remove ammonia by refrigeration, but as the partial pressure of the ammonia, at the temperatures and pressures present in such liquefaction, results in a portion of the ammonia leaving the cooling chamber with the residual gases and returning to the catalyst chamber, the efficiency of the catalyst is reduced in this instance also.

Most of the absorbents heretofore employed have been liquids. There have been marked disadvantages attending the use of liquid absorbents, in that it is necessary to employ pumps in order to have a counterflow arrangement, and, in the case of the refrigeration industry, the automatic circulatory system that is there employed requires that the gase bubble through a liquid head. Such a process requires pressure and additional power.

It is therefore perferable to use a solid absorbent in a refrigerating system. Heretofore silica gel has been the principal non-liquid adsorption or absorption agent. Silica gel has certain inherent disadvantages, as its adsorption per unit volume is small in comparison with certain of the substances which are the subject matter of this invention. To overcome the disadvantages heretofore encountered in adsorption or absorption agents is one of the objects of this invention.

Another object of my invention is to devise a method of absorbing ammonia with a minimum expenditure of energy, and that requires only a simple and inexpensive apparatus.

A further object of this invention is to provide an economical and efficient absorption agent for ammonia.

And yet another object of my invention is to provide an adsorption agent possessed of qualities of longevity.

To accomplish the above, my invention in general comprises substances capable of absorbing ammonia under certain conditions and adapted to give off the ammonia rapidly under different conditions.

My investigations have led to the discovery that certain salts, particularly inorganic salts in their ordinary condition, when subjected to a stream of anhydrous ammonia gas do not become a liquid but on the contrary remain in the solid condition and absorb large quantities of ammonia. As above pointed out, their stability in the solid state is particularly desirable, for a solid absorbent does not require the intricate and expensive apparatus for operation that is necessary where a liquid is used.

The solids that I have discovered in my investigation have a low vapor pressure of ammonia at temperatures around 10° C., but at higher temperatures the ammonia is given off very rapidly. These substances also give off the ammonia that they have absorbed by reduction of pressure. Among those salts that I have found particularly suitable to absorption of ammonia are silver chloride, anhydrous calcium chloride, and thorium chloride.

These substances remain in the solid state, and, unlike certain absorption agents heretofore employed, do not form solutions upon contact with ammonia. In the course of my investigations it has been found that these salts in forming compounds increase in volume on absorption of ammonia. This is desirable for such an absorbent occupies a large space and is of a porous nature. Thorium chloride, which I have found particularly excellent for my purpose, is a porcelain-like or hard crystalline substance. It forms several compounds with ammonia at increased pressure or decreased temperature, or both, such as $ThCl_4.4NH_3$, $ThCl_4.6NH_3$, $ThCl_4.7NH_3$, $ThCl_4.12NH_3$, and $ThCl_4.18NH_3$, and others.

A suitable apparatus for use with my absorbent is one in which a series of towers are arranged in either parallel or in series so that one tower at a time may be entirely removed from the system without interruption of process. Within the towers is placed the absorbent, and, by having a stream of gas containing ammonia pass through the towers, the ammonia is thereby absorbed.

To recover the ammonia from the absorbent, it is only necessary to release the pressure within the towers or to increase the temperature or to release the pressure and increase the temperature. The ammonia that is given off is a gas, and may then be absorbed in water or any other medium.

In a refrigerating apparatus the absorbent may be placed in a conventional absorber and the ammonia introduced thereto. To drive off the ammonia it is only necessary to apply heat or to decrease the pressure.

Although I have set forth an apparatus for my absorbent, it is of course to be understood that my invention is not to be limited to use in conjunction therewith.

It will be observed that I have provided an absorbent that is highly efficient, and that may be employed in an inexpensive and simple apparatus. I do not wish to be limited to the chloride salts only, as it is possible that under certain conditions of operation the bromide, or iodide, or other salts may be used. But I find that thorium chloride works well under most operating conditions and gives excellent results.

While I have described several embodiments of my invention, it is to be understood that the scope of my protection both as to article and use, is to be limited only by the appended claims.

I claim as my invention:

1. A method of separating ammonia from a gaseous mixture comprising passing the mixture in contact with a halogen salt of thorium maintained at a low temperature to absorb ammonia, and subjecting the salt containing the absorbed ammonia to a higher temperature and a reduced pressure to liberate the ammonia.

2. A method of separating ammonia from a gaseous mixture comprising passing the mixture through a plurality of towers containing thorium tetrachloride maintained at a low temperature to separate the ammonia from the gaseous mixture, increasing the temperature of the contents of the tower, and reducing the pressure thereon to drive off the absorbed ammonia.

3. A method of separating ammonia from a gaseous mixture, comprising passing the mixture in contact with a halogen salt of thorium maintained at a temperature of about 10° C. to absorb ammonia, and subjecting the salt containing the absorbed ammonia to a higher temperature and a reduced pressure to liberate the ammonia.

4. A method of separating ammonia from a gaseous mixture, comprising passing the mixture through a plurality of towers containing thorium tetrachloride maintained at a temperature of about 10° C., to separate the ammonia from the gaseous mixture, increasing the temperature of the contents of the tower and reducing the pressure thereon to drive off the absorbed ammonia.

In testimony whereof I affix my signature.

JOHN P. WETHERILL, 3D.